(12) United States Patent
Lau et al.

(10) Patent No.: US 10,075,520 B2
(45) Date of Patent: Sep. 11, 2018

(54) DISTRIBUTED AGGREGATION OF REAL-TIME METRICS FOR LARGE SCALE DISTRIBUTED SYSTEMS

(75) Inventors: Cheuk Wan William Lau, Bellevue, WA (US); Ravikant Cherukuri, Redmond, WA (US); George Joy, Kirkland, WA (US); Smriti Yamini, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 4 days.

(21) Appl. No.: 13/559,602

(22) Filed: Jul. 27, 2012

(65) Prior Publication Data

US 2014/0032741 A1    Jan. 30, 2014

(51) Int. Cl.
| | |
|---|---|
| *G06F 15/173* | (2006.01) |
| *H04L 29/08* | (2006.01) |
| *H04L 12/26* | (2006.01) |
| *G06F 11/34* | (2006.01) |
| *H04L 29/06* | (2006.01) |

(52) U.S. Cl.
CPC ...... *H04L 67/1095* (2013.01); *G06F 11/3409* (2013.01); *H04L 43/065* (2013.01); *H04L 67/125* (2013.01); *H04L 67/22* (2013.01); *H04L 69/28* (2013.01); *G06F 11/3476* (2013.01); *G06F 2201/835* (2013.01); *G06F 2201/865* (2013.01)

(58) Field of Classification Search
CPC ........ G06Q 30/02; G06Q 10/10; H04L 67/10; H04L 67/125; H04L 12/2602; H04L 69/28; Y10S 707/99945; G06F 15/173; G06F 11/3409; G06F 11/3476; G06F 2201/835; G06F 2201/865
USPC ............... 709/203, 217, 219, 223, 224, 230; 706/45; 370/229
See application file for complete search history.

(56) References Cited

U.S. PATENT DOCUMENTS

| | | | | |
|---|---|---|---|---|
| 4,849,879 | A * | 7/1989 | Chinnaswamy et al. | 706/45 |
| 6,002,753 | A * | 12/1999 | Morrison et al. | 379/112.01 |
| 6,678,245 | B1 * | 1/2004 | Cooper et al. | 370/230 |
| 7,337,032 | B1 * | 2/2008 | Nettles | G05B 19/41865 700/100 |

(Continued)

FOREIGN PATENT DOCUMENTS

WO    2004031951 A2    4/2004

OTHER PUBLICATIONS

"International Search Report", dated Sep. 30, 2013, Application No. PCT/US2013/052154, Filed Date: Jul. 26, 2013, pp. 8.

(Continued)

*Primary Examiner* — Thu Ha Nguyen
(74) *Attorney, Agent, or Firm* — Alleman Hall Creasman & Tuttle LLP

(57) ABSTRACT

In one embodiment, a metric collection system may collect application metrics across multiple data centers in specific time intervals. A local collection point 108 may establish an absolute reference time for a local data center 102. The local collection point 108 may determine a source reporting interval for an application 106 based on the absolute reference time. The local collection point 108 may receive a source metric report 300 for the application 106 based on the source reporting interval.

20 Claims, 7 Drawing Sheets

(56) References Cited

U.S. PATENT DOCUMENTS

| | | | | |
|---|---|---|---|---|
| 7,693,216 | B1* | 4/2010 | Katz | G01S 5/0027 375/239 |
| 8,099,257 | B2* | 1/2012 | Parvin | G16H 10/40 702/179 |
| 8,510,807 | B1* | 8/2013 | Elazary et al. | 726/4 |
| 8,677,174 | B2* | 3/2014 | Bobak | G06Q 10/06 705/7.11 |
| 9,921,936 | B2* | 3/2018 | Luchi | G06F 11/3452 |
| 2002/0032787 | A1* | 3/2002 | Overton et al. | 709/230 |
| 2002/0052947 | A1* | 5/2002 | Duimovich et al. | 709/224 |
| 2003/0078756 | A1 | 4/2003 | Couchot et al. | |
| 2004/0029589 | A1* | 2/2004 | Becker | H04B 1/70754 455/437 |
| 2004/0059701 | A1* | 3/2004 | Fedorov | 707/1 |
| 2004/0128379 | A1* | 7/2004 | Mizell et al. | 709/224 |
| 2005/0204052 | A1* | 9/2005 | Wang et al. | 709/231 |
| 2005/0256971 | A1 | 11/2005 | Colrain et al. | |
| 2006/0294221 | A1* | 12/2006 | Graupner et al. | 709/224 |
| 2007/0086336 | A1* | 4/2007 | Richards et al. | 370/229 |
| 2007/0195872 | A1* | 8/2007 | Diaz | 375/222 |
| 2008/0133478 | A1* | 6/2008 | Weiler et al. | 707/3 |
| 2008/0198757 | A1* | 8/2008 | Dan | H04L 41/5038 370/252 |
| 2008/0281963 | A1* | 11/2008 | Fletcher | H04L 41/046 709/224 |
| 2008/0313628 | A1 | 12/2008 | Justus et al. | |
| 2009/0135836 | A1* | 5/2009 | Veillette | G01D 4/004 370/400 |
| 2009/0196177 | A1* | 8/2009 | Teyeb | H04B 7/2606 370/231 |
| 2010/0188256 | A1* | 7/2010 | Cornwall et al. | 340/870.02 |
| 2010/0299457 | A1* | 11/2010 | Johnson | 710/13 |
| 2010/0306163 | A1* | 12/2010 | Beaty | G06F 9/5077 706/52 |
| 2011/0158160 | A1* | 6/2011 | McCullough | H04W 40/02 370/328 |
| 2011/0167035 | A1 | 7/2011 | Kesel et al. | |
| 2011/0273988 | A1* | 11/2011 | Tourrilhes | H04L 41/0816 370/237 |
| 2012/0124560 | A1* | 5/2012 | Indukuru | G06F 8/4442 717/127 |
| 2012/0158933 | A1* | 6/2012 | Shetty | H04L 41/0893 709/223 |
| 2012/0226804 | A1* | 9/2012 | Raja et al. | 709/224 |
| 2012/0269143 | A1* | 10/2012 | Bertrand | H04W 72/1231 370/329 |
| 2013/0036188 | A1* | 2/2013 | Ganu | H04W 48/02 709/217 |
| 2013/0070622 | A1* | 3/2013 | Degioanni et al. | 370/252 |
| 2013/0159221 | A1* | 6/2013 | Thompson | 706/12 |
| 2013/0268577 | A1* | 10/2013 | Oyman | H04W 76/16 709/203 |
| 2016/0360462 | A1* | 12/2016 | Chockalingam | H04W 36/30 |
| 2017/0006135 | A1* | 1/2017 | Siebel | H04L 67/02 |
| 2017/0168914 | A1* | 6/2017 | Altman | G06F 11/3495 |
| 2017/0222946 | A1* | 8/2017 | Ben Dayan | H04L 47/70 |
| 2018/0035345 | A1* | 2/2018 | Chockalingam | H04W 36/30 |

OTHER PUBLICATIONS

Isard, Michael, "Autopilot: automatic data center management", Retrieved at «http://paperhub.s3.amazonaws.com/e6a99c5b6a2ac68b4b47a0c68c5af4f5.pdf», Proceedings of ACM SIGOPS Operating Systems Review—Systems work at Microsoft Research, vol. 41, Issue 2, Apr. 2007, pp. 60-67.

"vSphere Monitoring and Performance" Retrieved at «http://pubs.vmware.com/vsphere-50/topic/com.vmware.ICbase/PDF/vsphere-esxi-vcenter-server-50-monitoring-performance-guide.pdf», 2011, pp. 86.

"Real-Time Windows Performance Monitoring", Retrieved at «http://docs.splunk.com/Documentation/Splunk/latest/Data/Real-timeWindowsperformancemonitoring», Retrieved Date: May 2, 2012, pp. 6.

"DataStax OpsCenter 2.0 Documentation", Retrieved at «http://www.datastax.com/docs/opscenter2.0/introduction», Retrieved Date: May 2, 2012, pp. 6.

"Oracle Tuxedo System and Application Monitor", Retrieved at «http://www.oracle.com/technetwork/middleware/tuxedo/overview/tuxedo-tsam-datasheet-130477.pdf», 2009, pp. 4.

"Chapter 10—Performance Tuning and Monitoring", Retrieved at «http://technet.microsoft.com/en-us/library/bb727100.aspx», Jan. 28, 2010, pp. 29.

Bohm, et al., "Aggregation of Real-Time System Monitoring Data for Analyzing Large-Scale Parallel and Distributed Computing Environments"Retrieved at «http://ieeexplore.ieee.org/stamp/stamp.jsp?tp=&arnumber=5581330», Proceedings 2010 12th IEEE International Conference on High Performance Computing and Communications (HPCC), Sep. 1, 2010. pp. 72-78.

* cited by examiner

| LOCAL COLLECTION POINT ID 310 | APP ID 320 | SERVER ID 330 | METRIC LABEL 340 | METRIC NAME 350 | TIME INTERVAL 360 |
|---|---|---|---|---|---|

300
Figure 3

| REMOTE COLLECTION POINT ID 410 | APP ID 420 | DATA CENTER ID 430 | METRIC LABEL 440 | METRIC VALUE 450 | TIME INTERVAL 460 | TIMESTAMP 470 |
|---|---|---|---|---|---|---|

DISTRIBUTED AGGREGATION OF REAL-TIME METRICS FOR LARGE SCALE DISTRIBUTED SYSTEMS

BACKGROUND

Many computational services may now be spread across multiple servers aggregated in data centers. An application may distribute tasks among different servers in the data center. An application may distribute performance of the tasks even further by incorporating other data centers. In order to perform these tasks more efficiently, each data center may communicate with each other.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to collecting application metrics across multiple data centers in specific time intervals. A local collection point may establish an absolute reference time for a local data center. The local collection point may determine a source reporting interval for an application based on the absolute reference time. The local collection point may receive a source metric report for the application based on the source reporting interval.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates, in a block diagram, one embodiment of a source metric report.

FIG. 4 illustrates, in a block diagram, one embodiment of a batch metric report.

DETAILED DESCRIPTION

Figure 1:
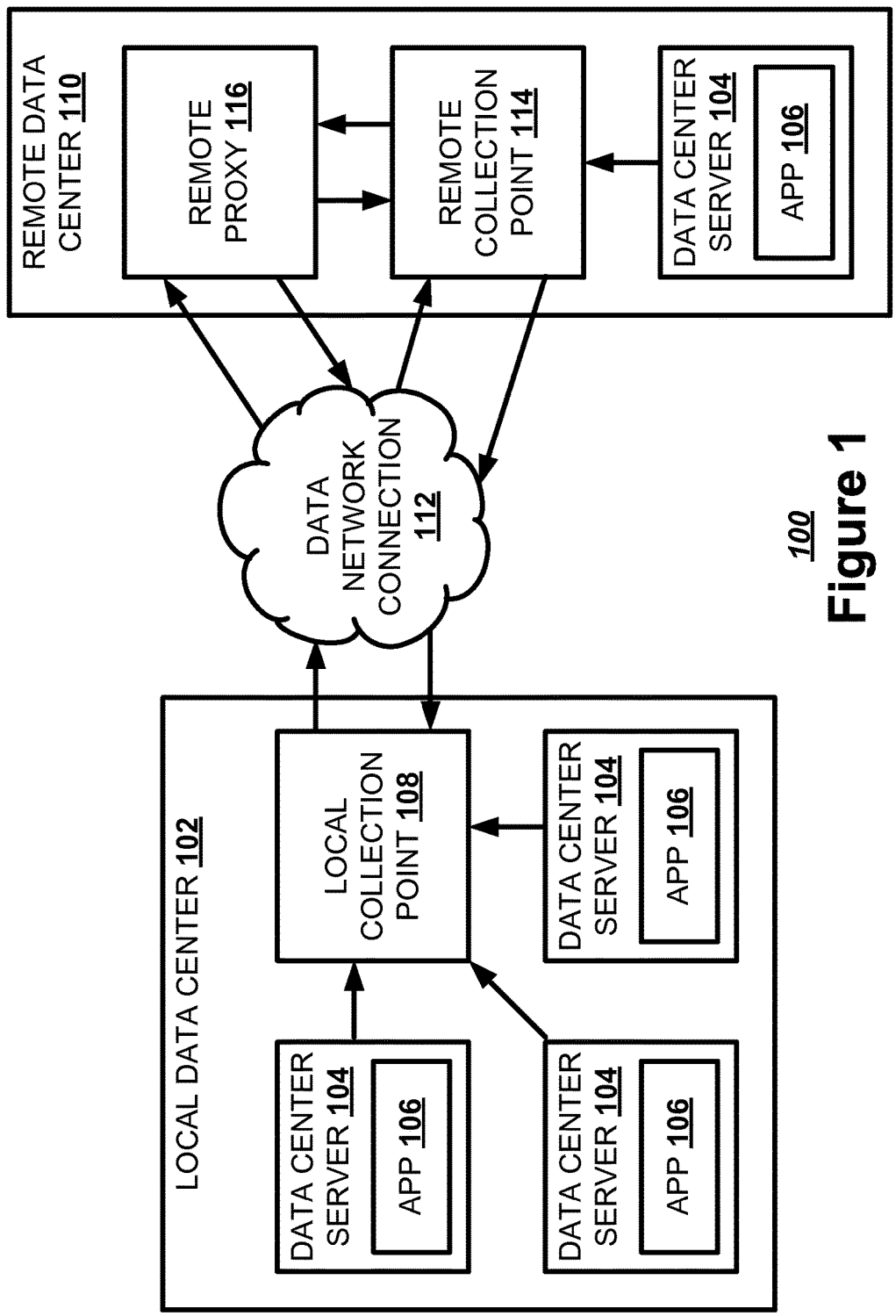
FIG. 1 illustrates, in a block diagram, one embodiment of a data center network.

Embodiments are discussed in detail below. While specific implementations are discussed, this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a data center server.

A data center may collect metrics describing the performance of various applications in measurement intervals at the source, a data center server. The data center server may then publish a source metric report to a collection point at the end of a source reporting interval. A data center server may be a source or a collection point, depending upon the application. The length of the source reporting intervals may vary for different metrics, as a trade-off between more frequent updates and the cost for sending or processing more network messages.

The data center may measure the source reporting interval in absolute time. Absolute time provides a fixed reference date and time, called an "absolute reference time", to determine the exact interval at any given point in time as well as the interval endpoint. Absolute time may allow different sources, or data center servers, to publish closer together at the end of each interval, depending on the time synchronization of the source clocks. A data center server may use some form of network time protocol (NTP) to synchronize clocks.

While the source clocks may never fully synchronize, a collection point may allow a reporting window for the published source metric report to arrive over the local area network. The collection report may accept source metric reports that arrive before the half-way point of the current reporting interval or after the half-way point of the previous reporting interval. The reporting window may be considered as the source reporting interval shifted backwards by half an interval. The reporting window may allow for variation of the source clock in respect to the collection point clock. A source clock may be hours different from a collection point clock, but the data center server may still push every interval and the collection point may accept the source metric report upon arrival.

To avoid each application sending a source metric report at the same time, referred to as a synchronized burst, the data center server may deterministically randomize the absolute interval that each application sends a source metric report. The data center server may apply a hashing function, such as a DJB function, that maps an application name or identifier into a number. The hash function may produce a uniformly distributed hashed number. The hashed number may determine the source reporting interval. For example, an absolute reference time of 12 am 1/1/0001, 5 minute intervals, and 1 second between each interval may provide 300 5-minute intervals to act as a source reporting interval. The data center may assign an interval based on a hashcode modulus 300.

A source may measure metrics for millions of applications with different interval endpoints for each. Publication of the source metric report may occur at the end of each interval and may arrive within the collection window time. A data center may utilize an event-driven approach with a lazy publishing trigger based on an event that updates the metric. Using such a publishing trigger, the data center server may publish to the collection point when triggered by the next update to the metric after the end of the interval. The publishing trigger may allow the data center server to forgo any additional timer logic to track multiple application metrics. A lazy publication may elevate getting accuracy for active applications.

The collection points for an application may be distributed across thousands of servers. Each data center, or cloud, may have a local collection point for each application. The data center may have collection points distributed with a consistent hash function, referred to as a collection hash, with each data center server knowing deterministically which server is used for collection for the metrics of an application. A distributed collection point may allow a load to be distributed across many servers, co-existing with other service logic. A distributed collection point may not have a central point of failure. Even during a server failure, collection points on other servers may still be available.

To calculate the global aggregate for a metrics, local collection points may publish a batch metric report to the different data-centers. The local collection point may compute the location of the remote collection point of the remote data center for the application using the same collection hash that determines the local collection point. Alternately, the local collection point may send the batch metric report via a proxy with the location of the remote collection point. The batch metric report may follow a similar model to the source metric report to compile and send the metric data. The remote collection point may aggregate metrics from the other data centers.

Cross data-center bandwidth may be expensive and less scalable than local bandwidth. Thus to reduce the load on cross cloud traffic, the cross data-center metric collection may batch multiple intervals together and send over a longer periodic batch interval. The remote collection point may identify each interval to aggregate the corresponding intervals in a batched publication. With an absolute interval approach, each cloud interval may match. To remedy for clock skew, the batch metric report may have a timestamp. If the remote collection point realizes that the clock skew is too wide, then the remote collection point may trigger a time synchronization with the network time protocol server. The remote collection point may respond to the publisher of the batch metric report with a request for resynchronization.

The local collection point may have an event driven publishing trigger. Using such a publishing trigger, after reaching the end of the batch interval, the next source metric report to the collection point may trigger the batch metric publication. Since the collection point is distributed over hundreds of servers, the number of collection points per server may be low enough to make a timer approach efficient.

Thus, in one embodiment, a metric collection system may collect application metrics across multiple data centers in specific time intervals. A local collection point may establish an absolute reference time for a local data center. The local collection point may determine a source reporting interval for an application based on the absolute reference time. The local collection point may receive a source metric report for the application based on the source reporting interval.

FIG. 1 illustrates, in a block diagram, one embodiment of a data center network 100. A local data center 102 may have one or more data center servers 104 connected by a local area network (LAN). Each data center server 104 may be running an application (APP) 106 as part of a distributed service. A data center server 104 running the application 106 may collect metric data describing the performance of the application 106.

The data center server 104, or source, may prepare a source metric report containing the metric data to be sent to a local collection point 108 in the local data center 102. A data center server 104 may be a source for one application 106 and a local collection point 108 for a different application 106. The local collection point 108 may process the source metric reports and determine any course of action, or source action, to be taken by a data center server 104, such as throttling the data transmission when a metric crosses a threshold. The local collection point 108 may compile the source metric reports into a batch metric report.

The local data center 102 may connect to a remote data center 110 via a data network connection 112. The local collection point 108 may send a batch metric report describing the operation of the application 106 in the local data center 102 to a remote collection point 114 in the remote data center 110. The remote collection point 114 for the remote data center 110 may be the local collection point 108 for that data center. Similarly, the local collection point 108 may receive a batch metric report describing the operation of the application 106 in the remote data center 110 from the remote collection point 114.

If the local collection point 108 is unable to determine a remote collection point 114 for the application 106 at the remote data center 110, then the local collection point 108 may send the batch metric report to a remote proxy 116 for the remote data center 110 for delivery to the remote collection point 114. Alternately, the local collection point 108 may use a central proxy to find the remote collection point 114 for each remote data center 110.

Figure 2:
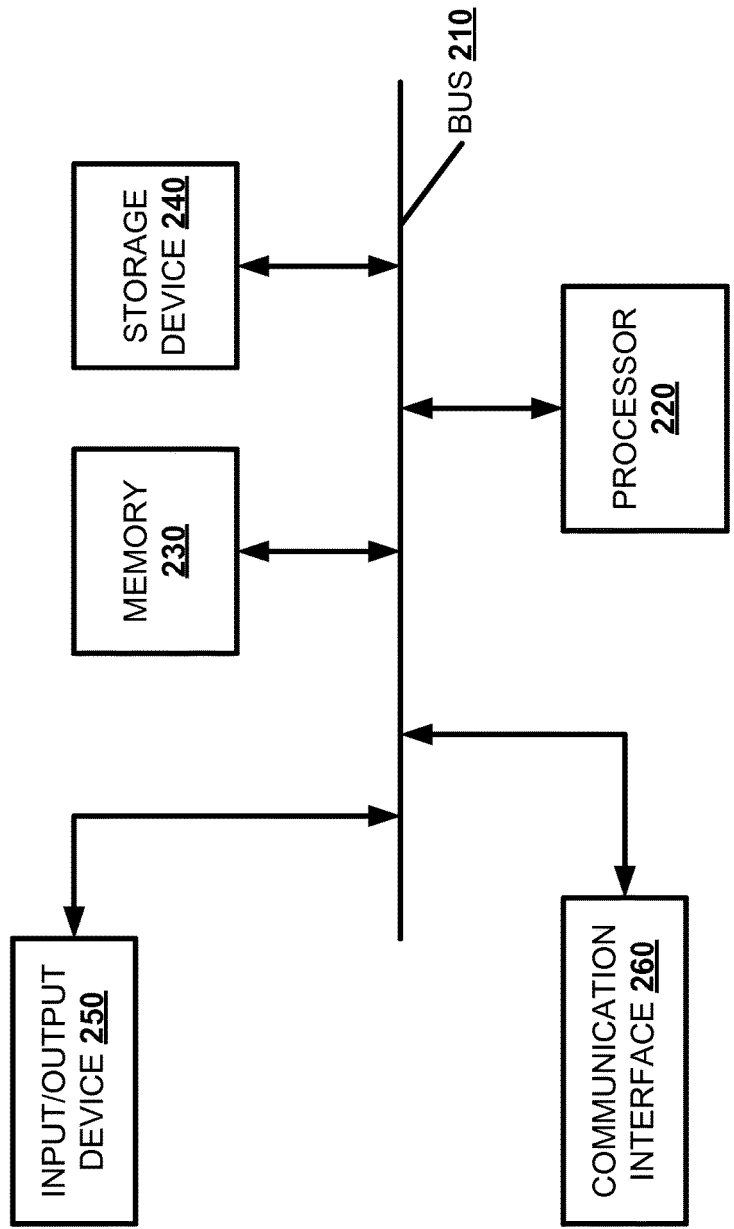
FIG. 2 illustrates, in a block diagram, one embodiment of a computing device.

FIG. 2 illustrates a block diagram of an exemplary computing device 200 which may act as a data center server. The computing device 200 may combine one or more of hardware, software, firmware, and system-on-a-chip technology to implement a data center server. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on a computer-readable media as described herein is distinguishable from having instructions propagated or transmitted, as the propagation transfers the instructions, versus stores the instructions such as can occur with a computer-readable storage medium having instructions stored thereon. Therefore, unless otherwise noted, references to computer-readable media or medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing metric data.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to a processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

An application 106 may measure multiple metrics. The application may send an individual source metric report for each metric. FIG. 3 illustrates, in a block diagram, one embodiment of a source metric report 300. The source metric report 300 may have a local collection point identifier (ID) 310 identifying the local collection point 108 receiving the source metric report 300. The source metric report 300 may have an application identifier (APP ID) 320 identifying the application 106 described in the source metric report 300. The source metric report 300 may have a server identifier 330 identifying the source data center server 104 sending the source metric report 300. The source metric report 300 may have a source metric label 340 identifying a metric being measured at the source data center server 104. A metric may describe the performance, operation, or other attributes of the application 106. The source metric report 300 may have a source metric value 350 indicating a measurement of the metric identified by the source metric label 340. The source metric report 300 may have a time interval field 360 identifying the time interval during which the metric data was collected.

The local collection point 108 may gather multiple source metric reports into a batch metric report. The batch metric report may gather multiple metrics. FIG. 4 illustrates, in a block diagram, one embodiment of a batch metric report 400. The batch metric report 400 may have a remote collection point identifier 410 identifying the remote collection point 114 receiving the batch metric report 400. The batch metric report 400 may have an application identifier 420 identifying the application 106 described in the batch metric report 400. The batch metric report 400 may have a data center identifier 430 identifying the local data center 102 sending the batch metric report 400. The batch metric report 400 may have a batch metric label 440 identifying a metric being measured at the local data center 102. The batch metric report 400 may have a batch metric value 450 indicating a measurement of the metric identified by the batch metric label 440. The batch metric report 400 may have a time interval field 460 identifying the time interval during which the metric data was collected. The batch metric report 400 may have a timestamp 470 identifying when the batch metric report 400 was published.

Figure 5:
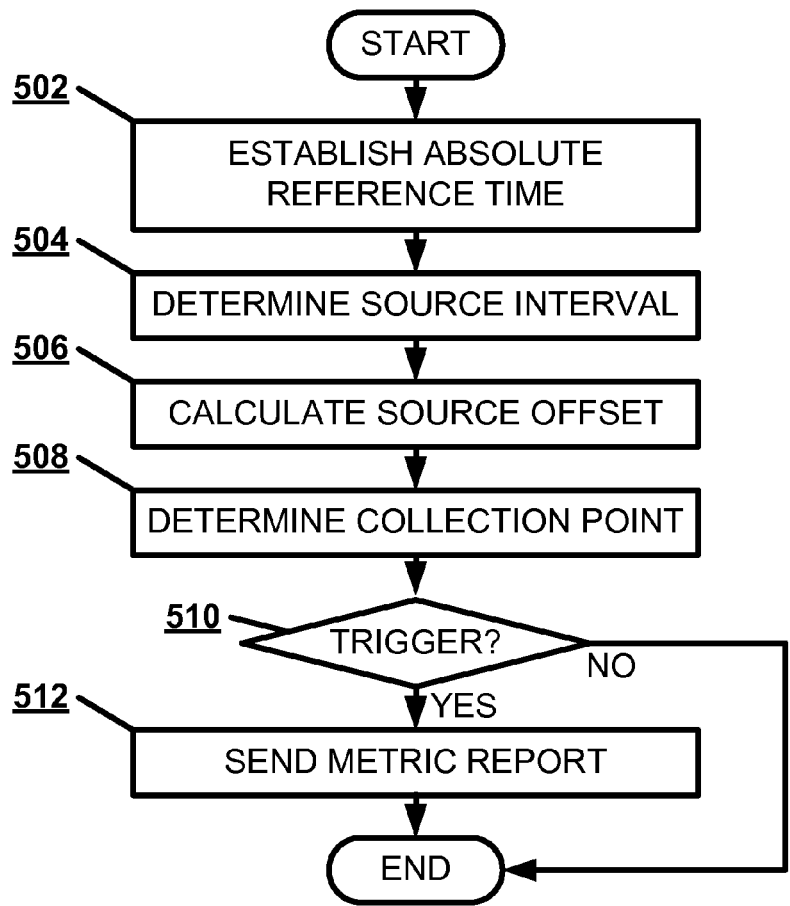
FIG. 5 illustrates, in a flowchart, one embodiment of a method for sending a source metric report.

FIG. 5 illustrates, in a flowchart, one embodiment of a method 500 sending a source metric report 300. A source local data center server 104 may establish an absolute reference time for a local data center 102 (Block 502). The source local data center server 104 may determine a source reporting interval for an application 106 based on the absolute reference time (Block 504). The source local data center server 104 may calculate a source offset for a source reporting interval by applying a source offset hash to an application identifier 320 (Block 506). The source local data center server 104 may determine the local collection point 108 by applying a collection hash to the application identifier 320 (Block 508). If the source local data center server 104 identifies a source publishing trigger to send the source metric report (Block 510), the source local data center server 104 may send the source metric report 300 for the application for the source reporting interval (Block 512).

Figure 6:
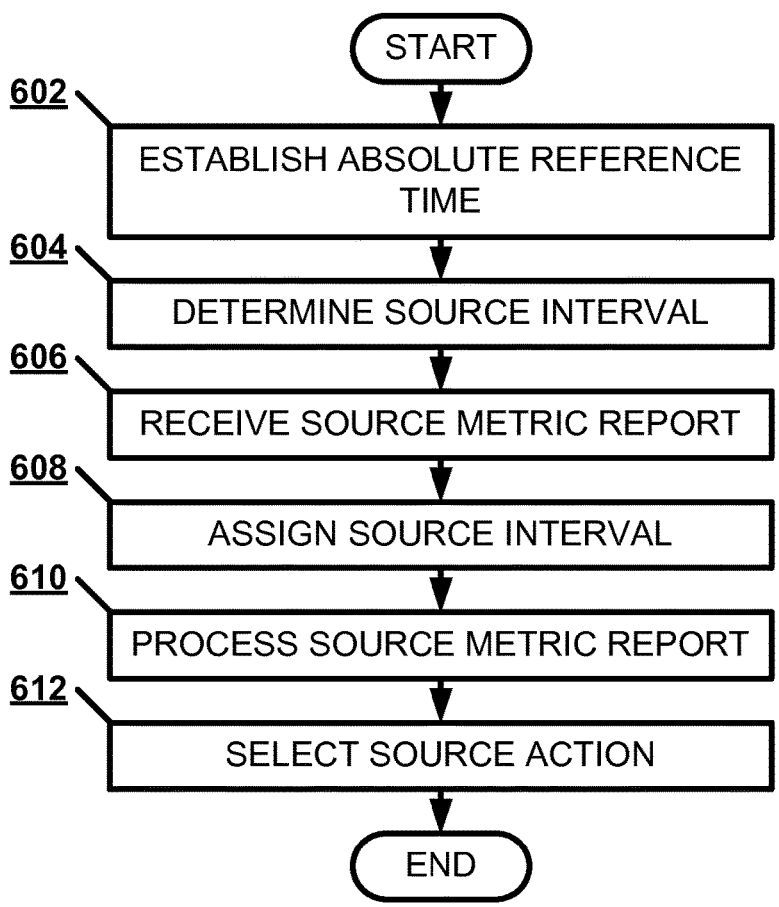
FIG. 6 illustrates, in a flowchart, one embodiment of a method for receiving a source metric report.

FIG. 6 illustrates, in a flowchart, one embodiment of a method 600 receiving a source metric report 300. A local collection point 108 may establish an absolute reference time for a local data center 102 (Block 602). The local collection point 108 may determine a source reporting interval for an application 106 based on the absolute reference time (Block 604). The local collection point 108 may receive a source metric report 300 for the application 106 based on the source reporting interval (Block 606). The local collection point 108 may assign the source reporting interval to the source metric report 300 when the source metric report is received during a reporting window (Block 608). The local collection point 108 may process the source metric report (Block 610). Processing the source metric report may include executing calculations, projections, or measurements based on the metric data. The local collection point 108 may select a source action based on the source metric report 300 (Block 612).

Figure 7:
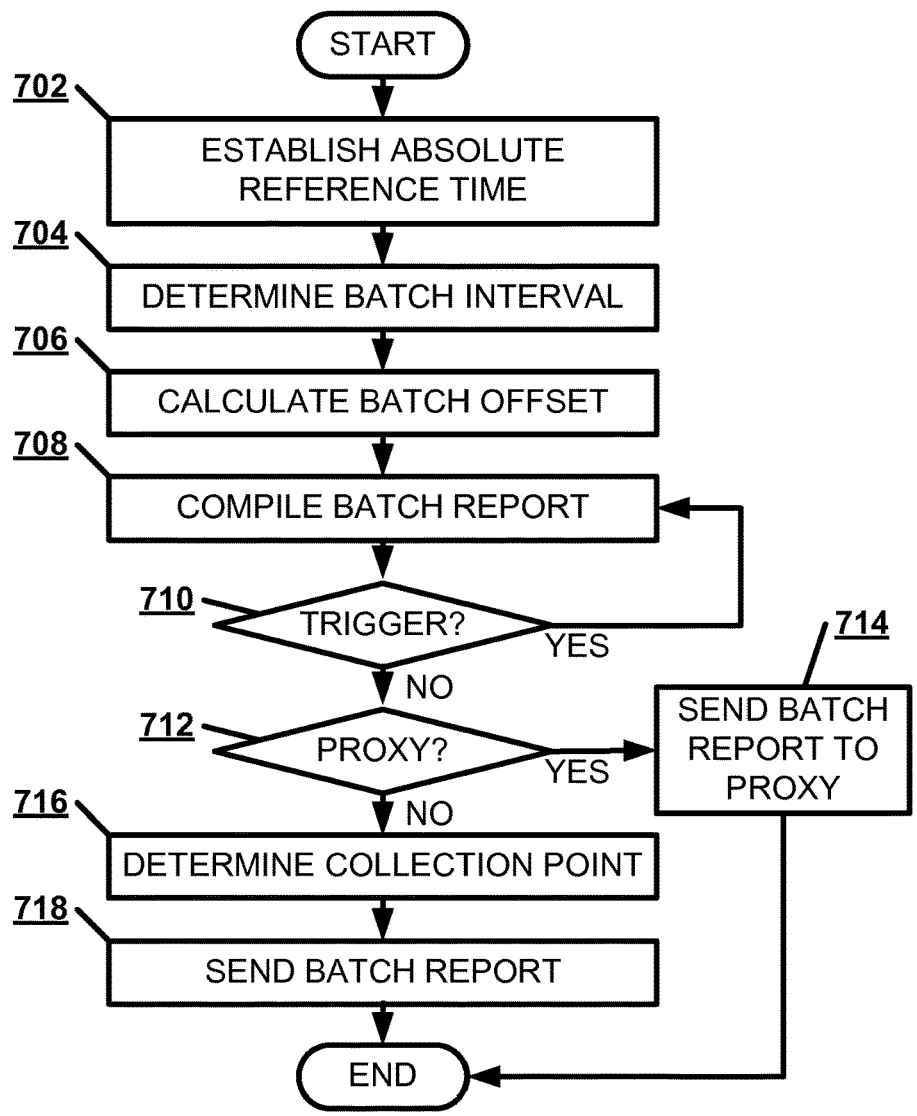
FIG. 7 illustrates, in a flowchart, one embodiment of a method for sending a batch metric report.

FIG. 7 illustrates, in a flowchart, one embodiment of a method 700 sending a batch metric report 400. A local collection point 108 may establish an absolute reference time for a local data center 102 (Block 702). The local collection point 108 may determine a batch interval for sending a local batch metric report to a remote data center 110 (Block 704). The local collection point 108 may calculate a batch offset for the interval by applying a batch offset hash to an application identifier 420 (Block 706). The local collection point 108 may compile a local batch metric report 400 to send to the remote data center 110 (Block 708). If the local collection point 108 identifies a batch publishing trigger for sending a local batch metric report 400 at a batch interval (Block 710), and if the local collection point 108 uses a remote proxy 116 to send a batch metric report 400 (Block 712), the local collection point 108 may send the local batch metric report 400 to a remote proxy 116 to determine a remote collection point 114 for a remote data center 110 (Block 714). If the local collection point 108 identifies a batch publishing trigger for sending a local batch metric report at a batch interval (Block 710), and if the local collection point 108 identifies a remote collection point 114 (Block 712), the local collection point 108 may determine the remote collection point 114 by applying a collection hash to the application identifier 420 (Block 716). The same collection hash that determines the remote collection point 114 may determine the local collection point 108. The local collection point 108 may send a local batch metric report 400 to a remote collection 114 point for a remote data center 110 (Block 718).

Figure 8:
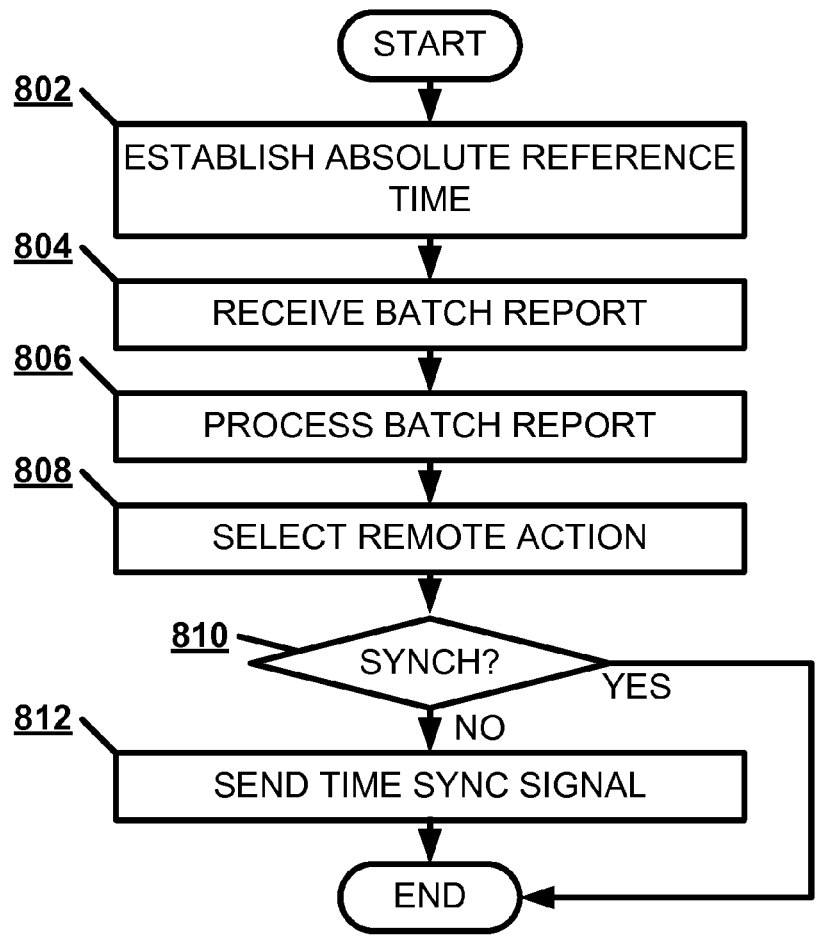
FIG. 8 illustrates, in a flowchart, one embodiment of a method for receiving a batch metric report.

FIG. 8 illustrates, in a flowchart, one embodiment of a method 800 receiving a batch metric report 400. A local collection point 108 may establish an absolute reference time for a local data center 102 (Block 802). The local collection point 108 may receive a remote batch metric report 400 chronicling an application 106 at a remote data center 110 (Block 804). The local collection point 108 may process the remote batch metric report 400 (Block 806). The local collection point 108 may select a remote action based on a remote batch metric report 400 (Block 808). A remote action is an action taken by the local collection point 108 based on the remote batch metric report 400. If the local collection point 108 determines that the local data center 102 is out of time synchronization with the remote data center 110 (Block 810), the local collection point 108 may send a time synchronization signal to the remote data center 110 (Block 812).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, electrically-erasable programmable read only memory (EEPROM), compact disc-read only memory (CD-ROM) or other optical disk storage, magnetic disk storage or other magnetic data storages, or any other medium which can be used to carry or store desired program code means in the form of computer-executable instructions or data structures. Combinations of the above may also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they do not limit the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
    establishing a fixed reference date and time as an absolute reference time for a source clock of a source local data center server and a collection point clock for a local data center at a local collection point;
    determining a source reporting interval for an application based on the absolute reference time, the source reporting interval being differently randomized for the application running on the source local data center server compared to the application running on another source local data center server;
    receiving a source metric report for the application during a reporting window representing the source reporting interval shifted by part of the source reporting interval to allow for variation of the source clock in respect to the collection point clock across a data network, wherein an event updating a metric described in the source metric report acts as a lazy publishing trigger to publish the source metric report;
    assigning the source reporting interval to the source metric report; and
    processing the source metric report.

2. The method of claim 1, further comprising:
    selecting a source action based on the source metric report.

3. The method of claim 1, further comprising:
    compiling a local batch metric report from multiple source metric reports; and
    sending the local batch metric report to a remote data center.

4. The method of claim 1, further comprising:
    determining a batch interval for sending a local batch metric report to a remote data center; and
    sending the local batch metric report to the remote data center.

5. The method of claim 1, further comprising:
    calculate a batch offset to randomize a batch interval by applying a batch offset hash to an application identifier for the application; and
    sending a local batch metric report to a remote data center at the batch offset.

6. The method of claim 1, further comprising:
    identifying a batch publishing trigger for sending a local batch metric report; and
    sending the local batch metric report to a remote data center upon identifying the batch publishing trigger.

7. The method of claim 1, further comprising:
    sending a local batch metric report to a remote collection point for a remote data center.

8. The method of claim 1, further comprising:
    determine a remote collection point by applying a collection hash to an application identifier; and
    sending a local batch metric report to the remote collection point.

9. The method of claim 1, further comprising:
    sending a local batch metric report to a remote proxy to determine a remote collection point for a remote data center.

10. The method of claim 1, further comprising:
receiving a remote batch metric report chronicling the application at a remote data center.

11. The method of claim 1, further comprising:
selecting a remote action based on a remote batch metric report.

12. The method of claim 1, further comprising:
sending a time synchronization signal to a remote data center.

13. A tangible machine-readable medium having a set of instructions detailing a method stored thereon that when executed by one or more processors cause the one or more processors to perform the method, the method comprising:
establishing a fixed reference date and time as an absolute reference time for a source clock at a source local data center server and a collection point clock at a local collection point;
determining a source reporting interval for an application based on the absolute reference time, the source reporting interval being differently randomized for the application running on the source local data center server compared to the application running on another source local data center server;
identifying a triggering event updating a metric described in a source metric report acting as a lazy publishing trigger; and
sending the source metric report for the application upon the triggering event to a local collection point at the source reporting interval.

14. The tangible machine-readable medium of claim 13, wherein the source reporting interval is randomized by applying a source offset hash to an application identifier for the application.

15. The tangible machine-readable medium of claim 13, wherein the method further comprises:
determining the local collection point by applying a collection hash to an application identifier for the application; and
sending the source metric report to the local collection point.

16. The tangible machine-readable medium of claim 13, wherein the method further comprises:
identifying a source publishing trigger to send the source metric report for the application; and
sending the source metric report to the local collection point upon identifying the source publishing trigger.

17. A data center server, comprising:
a collection point clock configured to establish a fixed reference date and time acting as an absolute reference time for a source clock at a source local data center server and the collection point clock;
a communication interface configured to receive a source metric report for an application from the source local data center, wherein an event updating a metric described in the source metric report during a reporting window representing a source reporting interval shifted by part of the source reporting interval to allow for variation of the source clock in respect to the collection point clock across a data network acts as a lazy publishing trigger to publish the source metric report; and
a processor configured to assign the source reporting interval to the source metric report based on the absolute reference time and processing the source metric report, the source reporting interval being differently randomized for the application running on the source local data center server compared to the application running on another source local data center server.

18. The data center server of claim 17, wherein the processor is configured to compile a local batch metric report to send to a remote data center at a batch interval and the communication interface is configured to send the local batch metric report to the remote data center.

19. The data center server of claim 17, wherein the processor is configured to determine a remote collection point by applying a collection hash to an application identifier of the application and the communication interface is configured to send the local batch metric report to the remote collection point.

20. The data center server of claim 17, wherein the processor is configured to identify a batch publishing trigger for sending a local batch metric report and the communication interface is configured to send the local batch metric report to a remote data center upon identifying the batch publishing trigger.

* * * * *